(12) United States Patent
Iraschko

(10) Patent No.: US 7,374,024 B2
(45) Date of Patent: May 20, 2008

(54) BRAKE DISC/HUB ASSEMBLY WITH DISPLACEABLE BRAKE DISCS

(75) Inventor: Johann Iraschko, Schweitenkirchen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/598,017

(22) Filed: Nov. 13, 2006

(65) Prior Publication Data

US 2007/0137947 A1 Jun. 21, 2007

Related U.S. Application Data

(63) Continuation of application No. PCT/EP2005/005074, filed on May 11, 2005.

(30) Foreign Application Priority Data

May 11, 2004 (DE) .................... 10 2004 023 748

(51) Int. Cl.
*F16D 55/36* (2006.01)
(52) U.S. Cl. ................................... 188/18 A
(58) Field of Classification Search ............... 188/17, 188/18 A, 26, 218 A, 218 XL
See application file for complete search history.

(56) References Cited

U.S. PATENT DOCUMENTS

| | | | |
|---|---|---|---|
| 3,469,658 A | | 9/1969 | Forsythe |
| 4,576,255 A | * | 3/1986 | Mery et al. ................. 188/71.5 |
| 4,598,799 A | * | 7/1986 | Thioux ....................... 188/71.5 |
| 4,614,254 A | * | 9/1986 | Mery et al. ................. 188/71.5 |
| 5,353,896 A | | 10/1994 | Baumgartner et al. |
| 5,582,273 A | | 12/1996 | Baumgartner et al. |
| 6,059,374 A | * | 5/2000 | Goddard ..................... 301/6.1 |
| 6,705,437 B2 | * | 3/2004 | Severinsson et al. ..... 188/73.32 |

FOREIGN PATENT DOCUMENTS

| | | |
|---|---|---|
| DE | 36 10 569 A1 | 10/1987 |
| DE | 37 16 202 A1 | 11/1988 |
| EP | 0 366 920 A1 | 5/1990 |
| EP | 0 531 321 B1 | 3/1993 |

OTHER PUBLICATIONS

International Search Report dated Aug. 22, 2005 including English translation of relevant portion (Four (4) pages).

* cited by examiner

*Primary Examiner*—Chris Schwartz
(74) *Attorney, Agent, or Firm*—Crowell & Moring LLP

(57) ABSTRACT

A brake disc/hub assembly is provided consisting of a hub and a brake disc axially displaceable with respect thereto. A sliding sleeve is guided in such a way that it is axially displaceable on the hub and the brake disc is mounted on the sliding sleeve in such a way that it is fixed with respect thereto.

17 Claims, 4 Drawing Sheets

BRAKE DISC/HUB ASSEMBLY WITH DISPLACEABLE BRAKE DISCS

CROSS REFERENCE TO RELATED APPLICATIONS

This application is a continuation of PCT International Application No. PCT/EP2005/005074, filed May 11, 2005, which claims priority under 35 U.S.C. § 119 to German Patent Application No. 10 2004 023 748.4 filed May 11, 2004, the entire disclosures of which are herein expressly incorporated by reference.

BACKGROUND AND SUMMARY OF THE INVENTION

The invention relates to a brake disc/hub assembly wherein the brake disc is displaceable axially relative to the hub.

Disc brakes may be generally divided into two basic types according to the chosen principle of force application: force generation and adjustment for pad wear on both sides of the brake disc: e.g. a hydraulic fixed caliper disc brake with axially fixed brake disc and force generation on both sides of the brake disc; and force generation and adjustment for pad wear on one side of the brake disc and transmission of the actuation force to the opposite side according to the reaction force principle: e.g. a sliding caliper disc brake, hinged caliper disc brake, and fixed caliper disc brake with displaceable brake disc.

Compressed-air-actuated (pneumatic) disc brakes for heavy commercial vehicles with rim diameters of 15 inches and above utilize the reaction force principle mainly because the arrangement of a compressed air actuating cylinder is possible only on the side of the vehicle wheel open towards the interior of the vehicle, owing to the confined installation conditions around the vehicle wheel (the so-called wheel "envelope"). Such designs are disclosed, for example, in DE 36 10 569 A1, DE 37 16 202 A1, EP 0 531 321 A1 (cf, in particular, the design of the adjusters in the manner of rotary drives) and EP 0 688 404 A1.

Sliding or hinged caliper disc brakes require a component fixed to the axle generally called the "carrier" or "torque" plate which carries or guides the brake pads/linings, absorbs the circumferential forces thereof during brake application, and carries the brake caliper, which is mounted in a coaxially displaceable manner with respect to the vehicle axle. The relative movement executed by the brake caliper with respect to the component fixed to the axle can be divided into a working stroke and a wear stroke. The working stroke is executed with each application of the brake to overcome the release clearance of the brake and to compensate for the elasticities of the brake linings and the caliper arising as force is applied. Depending on the amount of the actuation force and the size of the release clearance, the working stroke is usually less than 4 mm.

By contrast, the wear stroke is the wear adjustment travel executed by the caliper over a large number of brake applications in order to compensate for the pad wear on the reaction side of the brake. The wear stroke is composed of the wear on the outside brake lining together with the wear on the outside disc friction surface, and usually is up to 25 mm.

In the case of a brake construction having a fixed caliper and a displaceable disc, by contrast, the working stroke and wear stroke are produced by displacement of the disc. A fixed caliper brake with electromechanical wear adjustment devices on both sides of a brake disc is known, for example, from EP-B-1 230 491 (having U.S. Pat. No. 6,899,204).

With the construction having a displaceable brake disc, a problem arises in trying to keep the brake disc easily slidable on the guide zone of the hub over its full service life. Because of the confined installation conditions and the harsh environmental stresses, effective sealing is hardly achievable.

Against this background, there is therefore needed a displaceable brake disc, which is suitable for use, in particular, with a pneumatically or electromechanically actuated disc brake having a fixed caliper, and which is well protected against seizure as a result of corrosion and the like.

This, and other needs are provided by a brake disc/hub assembly, including a hub and a brake disc axially displaceable relative to the hub. A sliding sleeve on which the brake disc is arranged non-displaceably relative thereto, is guided in an axially displaceable manner on the hub.

According to the invention, the sliding sleeve, on which the brake disc is arranged non-displaceably relative thereto, is guided in an axially displaceable manner on the hub. The sliding sleeve, together with the hub and/or further elements, may be configured so as to be well protected from corrosion, such that seizure of the brake disc caused by corrosion can be avoided in a constructionally simple manner.

It is especially preferred if, corresponding recesses (in particular semi-cylindrical) recesses are distributed around the internal periphery of the sliding sleeve and around the external periphery of the hub, in which recesses intermediate elements for transmitting torque between the hub and the sliding sleeve are distributed. These elements provide good guidance and secure torque transmission between the sliding sleeve and the hub in a constructionally simple manner.

It is especially preferred if the brake disc has internal toothing and the sliding sleeve has corresponding external toothing and/or receptacles to receive the internal toothing to ensure good torque transmission in this region also. In this manner, low thermal stress on the wheel bearing assembly is also achieved, because the brake disc is not connected directly to the hub, but rather only via the toothing and the sliding sleeve. The axial fixing of the brake disc may be effected, for example, by use of relatively small screws or the like on the sliding sleeve. The solution using receptacles for the internal toothing may, in principle, also be implemented directly on a hub and represents an invention in its own right, which can be used to fix a brake disc even without the sliding sleeve, but which is also advantageously used as a development of the sliding sleeve. In this way, excessive loads that might cause fractures can be largely avoided.

The tooth profile may be configured so that the ingress of cooling air into the brake disc is not prevented if the latter has a plurality of friction rings.

It is especially preferred if at least one wiping and cleaning element and/or a rubbing ring and/or a sealing bellows additionally prevent the penetration of dirt into the sliding sleeve.

Further advantageous embodiments are described and claimed herein.

Other objects, advantages and novel features of the present invention will become apparent from the following detailed description of the invention when considered in conjunction with the accompanying drawings.

BRIEF DESCRIPTION OF THE DRAWING FIGURES

Figure 3:
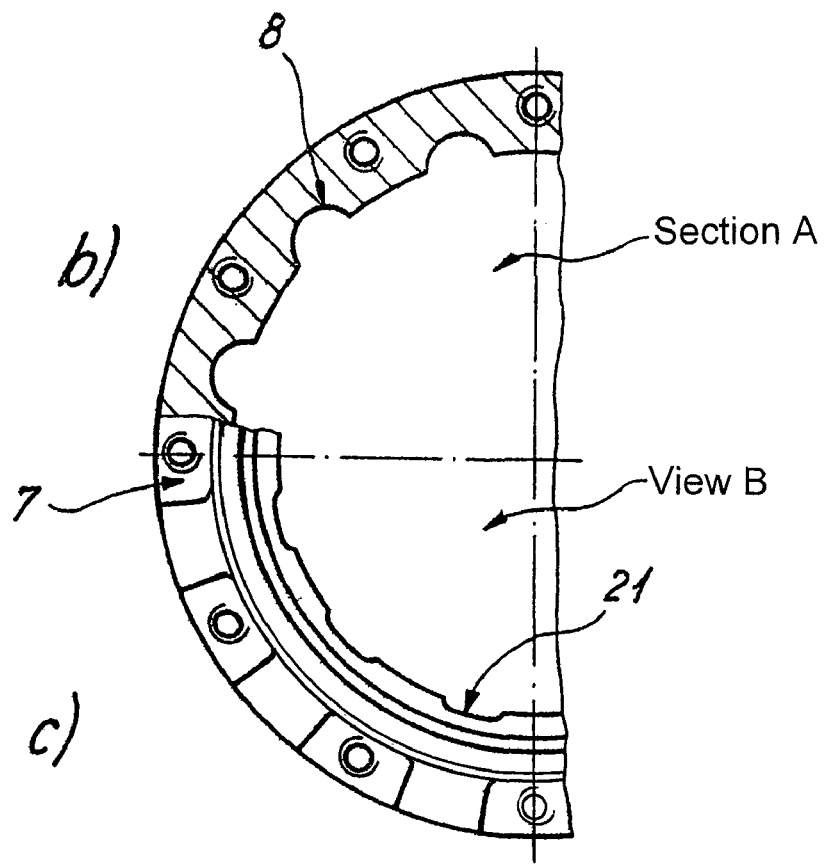
Figure 3:
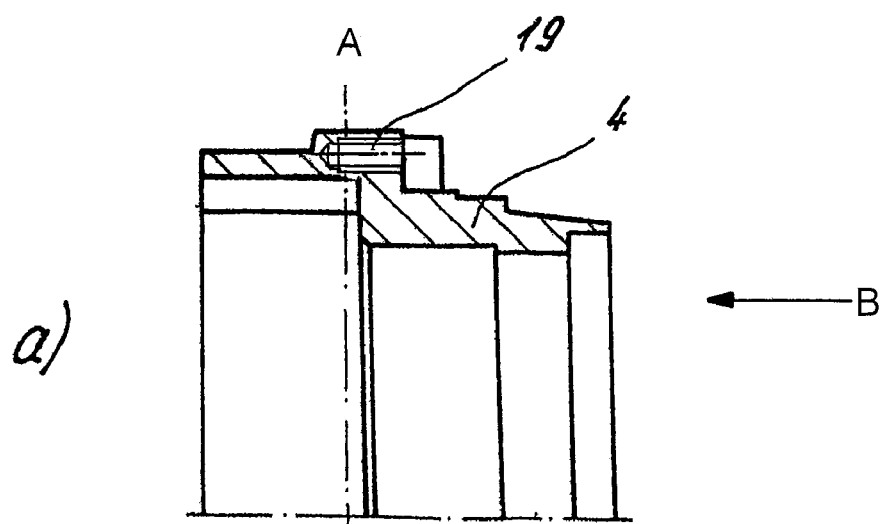

FIGS. 3a-c are different sectional views of a part of a sliding sleeve; and

Figure 4:
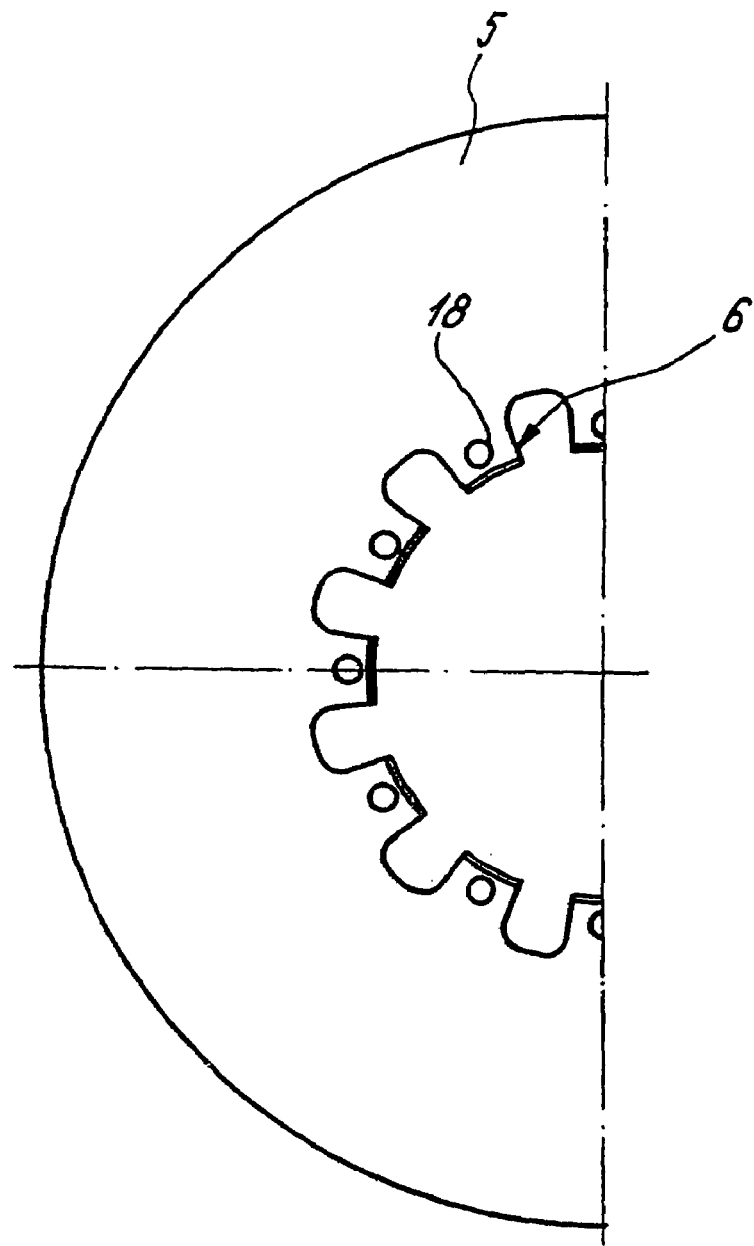

FIG. 4 is a partial view of a brake disc with internal toothing.

DETAILED DESCRIPTION OF THE DRAWINGS

Figure 1:
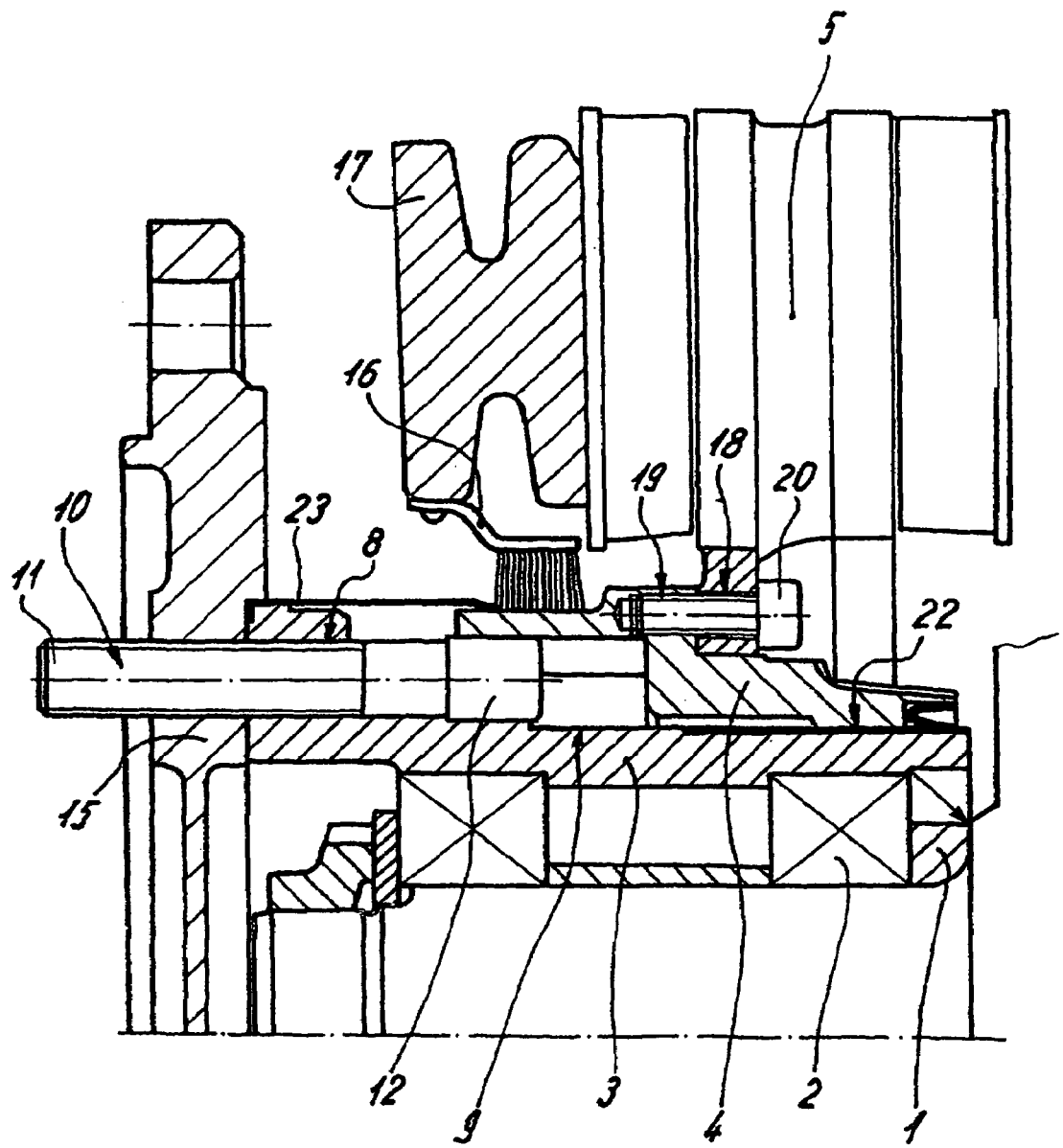
FIG. 1 shows a section through a part of an axle hub with the adjacent portion of a first brake disc with sliding sleeve.

FIG. 1 illustrates a hub 3 mounted rotatably relative to a wheel axle 1 by way of interposed bearings 2, on which hub 3 a sliding sleeve 4 having a stepped external periphery corresponding to the installation conditions is guided in an axially displaceable manner. In turn, a brake disc 5 is arranged on the sliding sleeve axially non-displaceably relative thereto, so that the sliding sleeve 4 and the brake disc 5 are jointly displaceable as a unit on the hub 3, preferably over the combined distance of the working stroke and the maximum wear stroke.

The brake disc 5 may have internal toothing 6, and the sleeve corresponding external toothing or corresponding receptacles 7, for receiving the internal toothing 6. The brake disc 5 is fixed axially in any desired manner, e.g. screwed to the sliding sleeve 4, wherein the sliding sleeve 4 and the brake disc 5 have corresponding bores 18, 19 in each of which a stud bolt 20 is inserted. Alternative means of fixing the internally toothed disc for torque transmission are of course possible.

Figure 2:
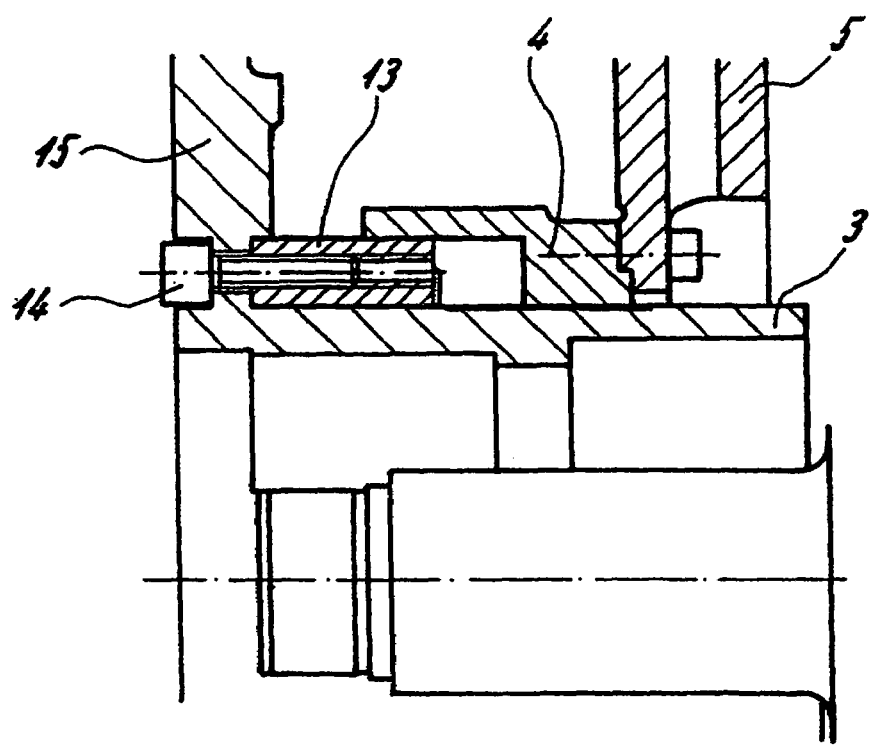
FIG. 2 shows a section through a part of an axle hub with the adjacent portion of a sliding sleeve and an alternative embodiment of the intermediate elements.

The sliding sleeve 4 has the longest possible axial dimension and makes maximum use of the available installation space in order to achieve the most advantageous possible guide length and, therefore, the most advantageous support. The displacement travel is limited on one side by the wheel carrier flange 15 (cf. FIGS. 1 and 2).

To transmit torque between the internal periphery of the sliding sleeve 4 and the external periphery of the hub 3, suitable interlocking contouring (not shown) is possible, or—and these variants are especially preferred—corresponding recesses 8, 9 are distributed around the internal periphery of the sliding sleeve 4 and the external periphery of the hub 3, in which recesses 8, 9 are inserted intermediate elements 10 such as pins 11 having preferably a cylindrical head 12 (FIG. 1) or preferably cylindrical sleeves 13, which are screwed to a wheel carrier flange 15, for example, by use of separate or integral threaded pins 14. The recesses 8, 9 extend over only a part of the axial length of the sliding sleeves 4.

Because of the corrosion-resistant configuration, a hermetic seal between the sliding sleeve 4 and the hub 3 is not required. Penetration of coarse dirt can be largely prevented by small gap dimensions and sealing measures between the sliding sleeve 4 and the hub 3.

The internal guide surface of the sliding sleeve 4 which is oriented toward the vehicle is configured as an interrupted cylindrical surface, so that any wiped material and dirt arising can collect in receptacles 21.

The corresponding working surface of the outer periphery of the hub 3 may be protected from corrosion by a pressed-on stainless sheet metal ring 22 (cylindrical sheet metal sleeve), optionally with special steel reinforcement, or may be corrosion-protected by another configuration.

Wiping and cleaning elements 16, which are fixable on the fixed caliper 17 and which act automatically as a result of the relative movement with respect to the rotating hub 3, are used to prevent deposition of dirt and incrustation of the exposed, non-covered sealing faces.

This effect can also be achieved by a kind of rubbing ring placed around the sealing faces. In this connection, reference is made to the sheet metal ring 23 on the external periphery of the sliding sleeve 4, which is pressed onto the wheel carrier flange 15.

In principle, the possibility also exists of sealing the sliding sleeve 4 by, for example, sealing bellows, in particular concertina bellows, in particular made of metal.

The arrangement of the brake disc 5 on the sliding sleeve by way of a toothing is also especially advantageous.

The displacement travel may correspond to the entire working stroke and wear dimension (in an embodiment with adjustment devices on only one side of the brake disc), or only to the working stroke (in an embodiment with adjustment devices on both sides of the brake disc).

TABLE OF REFERENCE NUMBERS

| | |
|---|---|
| Wheel axle | 1 |
| Bearing | 2 |
| Hub | 3 |
| Sliding sleeve | 4 |
| Brake disc | 5 |
| Internal toothing | 6 |
| External toothing | 7 |
| Recesses | 8, 9 |
| Intermediate elements | 10 |
| Pin | 11 |
| Head | 12 |
| Sleeves | 13 |
| Threaded pin | 14 |
| Wheel flange | 15 |
| Cleaning elements | 16 |
| Fixed caliper | 17 |
| Bores | 18, 19 |
| Stud bolt | 20 |
| Receptacles | 21 |
| Sheet metal ring | 22, 23 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc/hub assembly, comprising:
    a hub;
    a brake disc axially displaceable relative to the hub; and
    a sliding sleeve guided in an axially displaceable manner on the hub, the brake disc being arranged on the sliding sleeve in a non-displaceable manner; and
    wherein corresponding recesses are distributed around an internal periphery of the sliding sleeve and around an external periphery of the hub, and further wherein intermediate elements are distributed in the corresponding recesses such that torque transmission during braking between the sliding sleeve and the hub occurs essentially only through the intermediate elements.

2. The brake disc/hub assembly according to claim 1, wherein the brake disc has an internal toothing and the sliding sleeve has a corresponding external toothing for receiving the internal toothing of the brake disc, the brake disc being axially fixed to the sleeve via screws.

3. The brake disc/hub assembly according to claim 2, wherein corresponding recesses are distributed around an internal periphery of the sliding sleeve and around and external periphery of the hub, and further wherein intermediate elements are distributed in the corresponding recesses for transmitting torque between the sliding sleeve and the hub.

4. The brake disc/hub assembly according to claim 3, wherein the intermediate elements and the corresponding recesses extend over only a portion of the axial length of the sliding sleeve.

5. The brake disc/hub assembly according to claim 1, wherein the intermediate elements and the corresponding recesses extend over only a portion of the axial length of the sliding sleeve.

6. The brake disc/hub assembly according to claim 5, further comprising:
   a wheel carrier flange; and
   wherein the intermediate elements are fixed to the wheel carrier flange and are arranged non-displaceably relative to the hub.

7. The brake disc/hub assembly according to claim 5, wherein the intermediate elements are threaded pins having a cylindrical head.

8. The brake disc/hub assembly according to claim 1, further comprising:
   a wheel carrier flange; and
   wherein the intermediate elements are fixed to the wheel carrier flange and are arranged non-displaceably relative to the hub.

9. The brake disc/hub assembly according to in claim 1, wherein the sliding sleeve is mounted axially displaceably on the hub and non-rotatably relative to the hub.

10. The brake disc/hub assembly according to claim 1, wherein the intermediate elements are threaded pins having a cylindrical head.

11. The brake disc/hub assembly according to claim 1, wherein at least one of the hub and the sliding sleeve have a corrosion-protection configuration in a region of guide faces which slide displaceably on one another.

12. The brake disc/hub assembly according to claim 1, wherein the intermediate elements comprise sleeves in which are arranged threaded pins.

13. The brake disc/hub assembly according to claim 1, wherein at least one of the hub, the sliding sleeve, and the intermediate elements have a corrosion-protection configuration in a region of their guide faces which slide displaceably on one another.

14. The brake disc/hub assembly according to claim 1, further comprising a contamination prevention device operatively configured to prevent penetration of contaminates into the sliding sleeve.

15. The brake disc/hub assembly according to claim 14, wherein the contamination prevent device is in the form of at least one of a wiping and cleaning element, a rubbing ring, and a sealing bellows.

16. A brake disc/hub component for use with a brake disc axially displaceable relative to a hub, the component comprising:
   a substantially cylindrical sleeve, the sleeve being operatively configured on an external surface to secure a brake disc non-rotatably and non-axially displaceable relative to the sleeve, the sleeve being operatively configured on an internal surface so as to be axially displaceable over a length of the hub, and having recesses distributed around a periphery of the internal surface, the recesses being operatively configured to correspond with associated recesses formed around an external periphery of the hub, such that the recesses of the sliding sleeve are adapted to receive intermediate elements between the sliding sleeve and the hub, whereby braking torque is transmitted from the sliding sleeve to the hub essentially only through the intermediate elements.
   wherein corresponding recesses are distributed around an internal periphery of the sliding sleeve and around an external periphery of the hub, and further wherein intermediate elements are distributed in the corresponding recesses such that torque transmission during braking between the sliding sleeve and the hub occurs essentially only through the intermediate elements.

17. The component according to claim 16, wherein the internal surface of the sleeve is provided with a corrosion-protection mechanism in a region which is axially displaceable over the hub.

* * * * *